United States Patent
Tolbert, Jr. et al.

(10) Patent No.: US 6,172,476 B1
(45) Date of Patent: Jan. 9, 2001

(54) TWO STEP POWER OUTPUT MOTOR AND ASSOCIATED HVAC SYSTEMS AND METHODS

(75) Inventors: John W. Tolbert, Jr.; Michael R Young, both of Bristol, TN (US); David T Monk, Bristol, VA (US); Joseph F Loprete, Bristol, TN (US)

(73) Assignee: Bristol Compressors, Inc., Bristol, VA (US)

( * ) Notice: Under 35 U.S.C. 154(b), the term of this patent shall be extended for 0 days.

(21) Appl. No.: 09/133,840

(22) Filed: Aug. 13, 1998

Related U.S. Application Data

(63) Continuation-in-part of application No. 09/014,752, filed on Jan. 28, 1998.

(51) Int. Cl.⁷ .................................................. H02P 1/26
(52) U.S. Cl. ........................ 318/772; 318/806; 62/228.4
(58) Field of Search .................. 318/739, 740, 318/749, 751, 752–755, 772, 778–781, 785, 786, 798–811; 62/228.1, 228.4, 230, 207

(56) References Cited

U.S. PATENT DOCUMENTS

| | | |
|---|---|---|
| 4,031,778 | 6/1977 | Fazekas . |
| 4,236,874 | 12/1980 | Sisk . |
| 4,242,626 | 12/1980 | Gross . |
| 4,245,966 | 1/1981 | Riffe . |
| 4,248,053 | 2/1981 | Sisk . |
| 4,396,359 | 8/1983 | Kropiwnicki . |
| 4,409,532 | 10/1983 | Hollenbeck et al. . |
| 4,472,670 | 9/1984 | Stanley . |
| 4,479,419 | 10/1984 | Wolfe . |
| 4,494,447 | 1/1985 | Sisk . |
| 4,503,371 * | 3/1985 | Sugita .................................. 318/443 |
| 4,566,289 * | 1/1986 | Iizuka et al. ........................ 62/228.4 |
| 4,598,764 * | 7/1986 | Beckey ................................. 165/242 |
| 4,687,982 | 8/1987 | Palaniappan . |
| 4,718,247 | 1/1988 | Kobayashi et al. . |
| 4,765,150 * | 8/1988 | Persem ................................... 62/215 |
| 4,767,293 | 8/1988 | Caillat et al. . |
| 4,838,769 | 6/1989 | Gannaway . |
| 4,879,502 * | 11/1989 | Endo et al. .......................... 318/723 |
| 4,963,075 | 10/1990 | Albertson et al. . |
| 5,070,932 * | 12/1991 | Vlasak ................................. 165/240 |
| 5,080,130 | 1/1992 | Terwilliger et al. . |
| 5,106,278 | 4/1992 | Terwilliger . |
| 5,129,792 | 7/1992 | Abousabha . |
| 5,201,640 | 4/1993 | Heinzelmann et al. . |
| 5,203,857 | 4/1993 | Terwilliger et al. . |
| 5,252,905 * | 10/1993 | Wills et al. .......................... 318/807 |
| 5,548,969 * | 8/1996 | Lee ..................................... 62/228.4 |
| 5,592,059 * | 1/1997 | Archer ................................. 318/254 |
| 5,619,860 * | 4/1997 | Yuji et al. ............................ 62/163 |
| 5,780,990 * | 7/1998 | Weber ................................. 318/807 |
| 6,070,110 * | 5/2000 | Shah et al. . |

FOREIGN PATENT DOCUMENTS

| | | |
|---|---|---|
| 3138812 | 4/1983 | (DE) . |
| 4322223 | 1/1995 | (DE) . |
| 0 547351 A2 | 6/1993 | (EP) . |

* cited by examiner

*Primary Examiner*—Brian Sircus
(74) *Attorney, Agent, or Firm*—Finnegan, Henderson, Farabow, Garrett & Dunner, L.L.P.

(57) ABSTRACT

An electrical control system for an induction motor for achieving optimum efficiency at both full and partial loads at markedly reduced electrical components costs while maximizing reliability over the range of load, and for achieving a two step motor power output in a greatly simplified manner, the circuit having an electrical induction motor adapted for connection to line electrical power at maximum motor operating frequency, and to a second source of electrical power at approximately one half of the maximum operating frequency, wherein an electrical switch is provided for selectively connecting each power source to the motor, wherein the second source is a reduced frequency wave form generator for producing a reduced frequency wave form.

17 Claims, 4 Drawing Sheets

TWO STEP POWER OUTPUT MOTOR AND ASSOCIATED HVAC SYSTEMS AND METHODS

CROSS REFERENCE TO RELATED APPLICATION

This present application is a continuation-in-part of U.S. application Ser. No. 09/014,752, filed on Jan. 28, 1998, for Two Step Power Output Motor.

BACKGROUND OF THE INVENTION

This invention concerns a highly simplified speed control system for use with electrical motors of all types and phase wiring, especially for blower or fan induction motors used in conjunction with air moving devices (e.g. blowers and fans) in air conditioning systems, or with the motors which drive refrigerant compressors in such systems. Under the invention, the motor can be readily shifted between a full load first speed and a reduced load second speed.

The invention further concerns the application of such motors and controls to various heating and air conditioning ("HVAC") applications, particularly ones in which air mover or compressors can be operated at two or more stages. Examples of two stage compressors are shown in U.S. Pat. Nos. 4,396,359; 5,129,792; and 5,201,640, the disclosures of which are hereby incorporated herein by reference.

In regard to compressors, vacuum or other pumps or machines, and particularly those reciprocating piston compressors used in single or multiple cylinder refrigeration, air conditioning, or heat pumps systems or the like, including machines such as scotch yoke compressors of U.S. Pat. No. 4,838,769, it is often desirable to vary the compressor output, i.e., compressor capacity, in accordance with cooling load requirements. Such modulation can allow large gains in efficiency while normally providing reduced sound, improved reliability, and improved creature comforts. The potential benefits include one or more of reduced air noise, better dehumidification, warmer air in heat pump mode, or the like.

When a two or multi-stage compressor is incorporated into an air conditioning or heat pump system, the system typically includes an indoor blower or fan. When such a blower or fan motor is used with such modulatable compressors, there is a need for a motor speed control system which reduces the input power to the motor in proportion to the power necessary to attain the desired optimum cubit feet per minute ("CFM") of air flow for the reduced capacity mode. For example, the compressor capacity in a two stage compressor might be reduced approximately 50%. If the evaporator blower motor is maintained at high CFM air output when the compressor capacity is decreased by 50%, the capacity of the evaporator coil served by the blower is reached at a significantly lower air flow level associated with 50% of full compressor capacity. Since one function of the evaporator is to change liquid to vapor and thus absorb heat, once the evaporator capacity is reached, the heat absorbed becomes sensible and further heat is absorbed by the refrigerant itself. This reduces the molecular density of the refrigerant, and the overall efficiency of the system is thus compromised.

Another function of the evaporator in the air-conditioning mode is to remove moisture from the air used to condition the space. To remove this moisture, the temperature of the evaporator surface must be less than the dew point of the air passing over the evaporator surface. If the output of the evaporator blower motor is not reduced when the compressor capacity is reduced, the temperature of the evaporator surface might exceed the dew point of the air and, therefore, provide little or no moisture removal. In addition to reducing customer comfort, the failure to remove moisture from the air will reduce the overall evaporator capacity because the moisture removal provides a change in state on the evaporator surface, this being called the "sensible" heat removal. It is desirable to have a Sensible/Total ratio of about 0.7. Any S/T ratio less than this will cause reduced evaporator capacity, as well as customer discomfort. Thus, the output of the evaporator blower motor should be reduced when the compressor capacity is reduced. Preferably, the power input to the blower motor should be reduced by the cube of the desired decrease in blower motor output to match the reduced compressor capacity.

The reduction in motor speed of a blower or fan, however, is not without its difficulties. Many negative electrical phenomena are associated with conventional motor speed reducers which employ means such as winding tapping and solid state voltage reduction, i.e., wave form chopping, to change induction motor speed in response to a change in cooling load requirements. One undesirable phenomenon is the reduction in motor efficiency, i.e., Power out/Power in ratio, which occurs when the motor "designed optimum load point" is under reached. This phenomenon is classically represented by the speed/torque/efficiency curve well known to the electrical motor art.

Commercially available equipment exists on the market for providing full range optimum efficiency for motors. Such equipment include totally variable speed, motor controller or inverter devices such as that shown schematically on page 9 and described fully at page 63 of ©1996 Warner Electric, ®SECO Electronics Installation & Operation Manual for SECO® AC Drive, SL 3000 Series AC Motor Drives, the disclosures of which Manual is hereby incorporated herein by reference in its entirety.

Further details and theory of electrical circuitry for inverters in general is given on pages 440–451 of the book entitled ELECTRICITY, Principles and Applications, by Richard Fowler, Western Washington University, McGraw-Hill Book Company, Gregg Division, ISBN-0-07-021704-1, which publication is hereby incorporated herein in its entirety.

However, such inverters are expensive and complex since they must give wide band operation. Such inverters are typically sized for the highest frequency/speed, e.g., max motor speed and max Hz. Such sizing requires large, heavy electric load carrying components, more complex microprocessors, heavier DC current, and the like. Also, their complexities adversely affect their reliability, particularly as the result of lengthy use for varying motor speed over a wide range.

SUMMARY OF THE INVENTION

One object of the present invention is to provide an electrical motor speed control system which is non-complex, operates reliably, and can be manufactured at greatly reduced expense. A further object is to provide such a control that provides two speed motor control. Other objects are to apply such controls to HVAC systems and methods that provide greater efficiency or comfort, or both. A preferred object is to apply such a control to a blower motor or fan, incorporated in a HVAC system that includes a two stage compressor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

In accordance with the objects and in accordance with the purpose of the invention, as embodied and broadly described herein, one structural embodiment of the invention is defined as an electrical control system for an induction motor for achieving optimum efficiency at both full and partial loads at markedly reduced electrical components costs while maximizing reliability over the range of load and for achieving a two step motor power output in a greatly simplified manner. The system includes an electrical induction motor, a first source of electrical power at maximum motor operating frequency, preferably line power derived from general public power grids, a second source of electrical power at less than said maximum operating frequency, and a switch for selectively connecting each said source to said motor. The second source of power preferably is generated by a reduced frequency wave form generator. The first source of power preferably has a frequency of about 60 Hz, and the second source of power preferably has a frequency of about 30 Hz. In the preferred embodiment, the motor and the sources of power are all single phase.

In accordance with the objects and in accordance with the purpose of the invention, as embodied and broadly described herein, the invention further comprises an electrical control system for driving an induction motor at two preselected speeds, the system consisting essentially of a switching device for connecting the motor directly to a first source of electrical power in the form of line power and a frequency wave form generator connected with the line power for developing a single second source of electrical power having a second preselected frequency different than the frequency of the line power. The switching device preferably has the capability of selectively connecting, according to preselected criteria, either the line power to the induction motor to thereby run the motor at a first preselected speed or the second source of power to the induction motor to thereby run the motor at a second preselected speed. This simplified combination of elements provides two speed control of a motor in a highly efficient and inexpensive manner. The induction motor preferably drives an air mover or compressor of an HVAC system, and the switching device preferably includes or is driven by a two stage thermostat.

The invention further comprises a method for operating a system for conditioning a space, the system including a compressor with an electrical motor, an expansion valve, a condenser, an air mover with an electrical motor, and an evaporator. The method includes the steps of sensing the condition of the space to be treated, operating the compressor at a first preselected and fixed speed when the sensed conditions indicates that the system should be operated at a maximum load, operating the compressor at a second preselected and fixed speed, lower than the first speed, when the sensed condition indicates that the system should be operated at a lesser load, and driving the motor of the air mover by line current when the compressor operates at the first preselected speed and by a second source of fixed power at a frequency lower than the frequency of the line current, when the compressor operates at the second preselected speed.

In this method, the compressor preferably is a two stage compressor, the air mover is an indoor blower, the second source of power is generated by a wave form generator connected to the line power, and a two stage thermostat senses the condition of the space. The compressor can be a two stage reciprocating compressor having a variable crank throw and a motor that operates on the run winding at its first stage and on the start winding at its second stage. These windings are preferably designed to match the two staged loads of the compressor, while maximizing motor efficiency and minimizing energy costs.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

DETAILED DESCRIPTION OF THE DRAWINGS

Reference will now be made in detail to present preferred embodiments of the invention, examples of which are illustrated in the accompanying drawings. Wherever possible, the same reference numbers will be used throughout the drawings to refer to the same or like parts.

As explained in detail below, the present invention relates to control systems and methods for obtaining optimum motor efficiency at both full and partial loads and for achieving a two-step motor power output in a simplified manner. In the preferred embodiments, such controls are applied to components in a heating, ventilating, and air conditioning (HVAC) systems. In application, the control system can provide two stage operation of blower motors, compressors, and other HVAC components to account for the varying load requirements on the HVAC system. In one preferred embodiment, the operation of the compressor and blower are modulated at matched stages to improve the efficiency of the HVAC system, while maintaining the level of comfort in the conditioned space.

In accordance with the present invention, a control system is provided for an induction motor for achieving optimum efficiency at both full and partial loads at reduced electrical components costs and for achieving a two step motor power output in a simplified manner. The control system includes a first source of electrical power at a maximum operating frequency, a second source of electrical power at less than the maximum operating frequency, and a switch for selectively connecting each said source to the induction motor. When the motor is connected to the first source of electrical power, the motor operates at its highest speed and power output. When the motor is connected to the second source of electrical power, the motor operates at a lower speed and power output.

Figure 1:
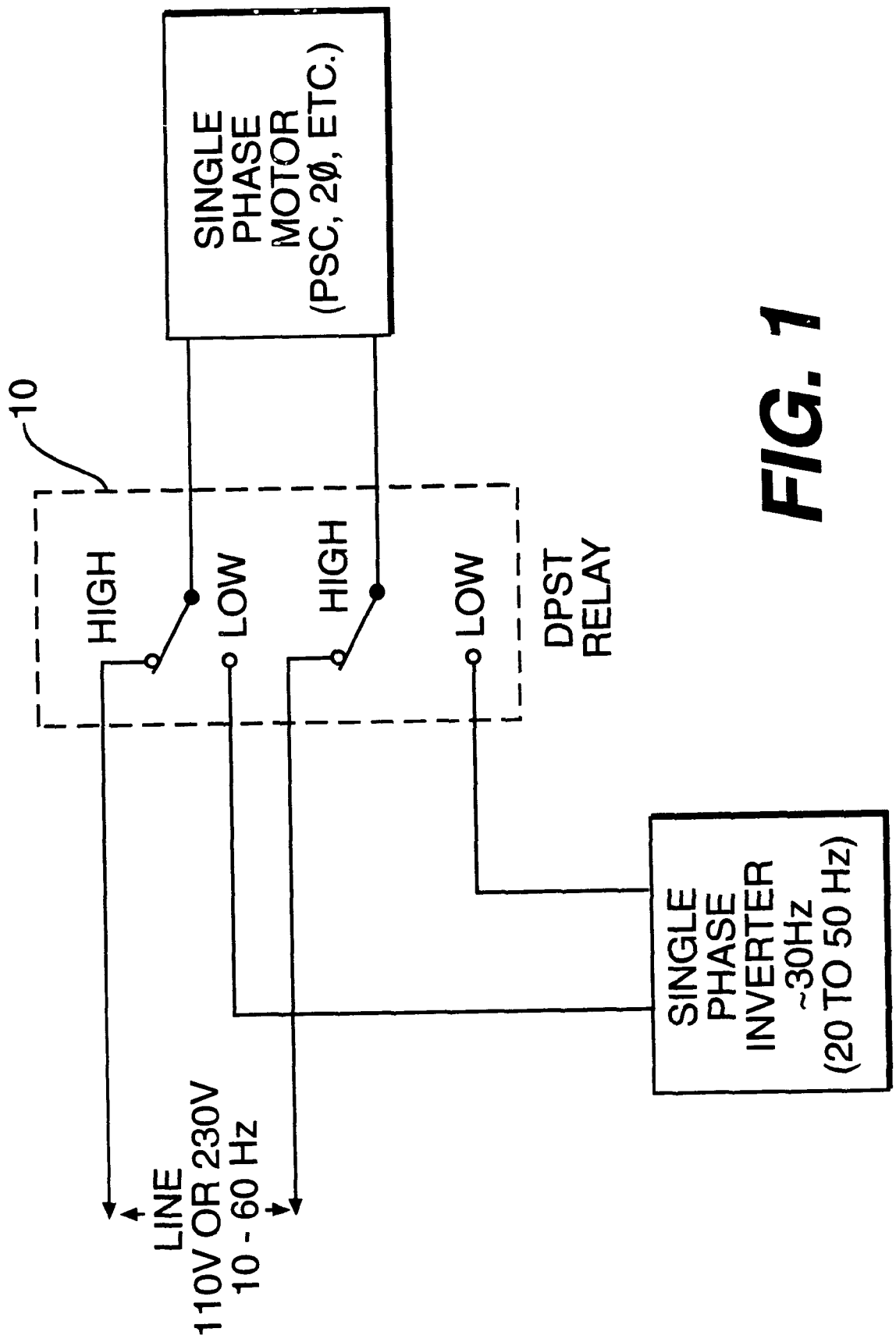
FIG. 1 is an electrical schematic of a motor control circuit of the present invention.

One exemplary embodiment of a control according to the present invention is illustrated in FIG. 1. As shown, a motor 16 is connected to a first source of electrical power 23 with power lines 22 and a second source of electrical power 12 with power lines 24. A switch 14 selectively connects motor 16 to either the first or the second source of electrical power. Preferably, the motor is a single phase, induction motor.

In the exemplary embodiment, switch 14 includes a set of high contacts 18 and a set of low contacts 20. The switch includes a solenoid type of contactor that operates to selectively engage either the high contacts or the low contacts. One such solenoid type of contactor is readily commercially available as per the General Electric "Definite Purpose Controls" Product Information catalogue, 23 pages, GEA—11540B 4/87 15M 1800, which publication is hereby incorporated herein by reference in its entirety. However, it is contemplated that a number of alternative switching devices can also be used to switch the application of two different power sources to the motor, as will be readily apparent to one skilled in the art.

To operate the motor at full output capacity, switch 14 is engaged with high contacts 18 which connects the motor to the first source of power 23. In a preferred embodiment, the first source of electric power is line power at the conventional voltage and frequency. Preferably, the first source of power is single phase and has a frequency within the range of about 50–60 hertz and voltage in the range of about 110–277 volts. More preferably, the voltage of the first source of power has a voltage in the range of about 110–240 volts. Thus, at full output capacity, the motor is driven by the higher frequency of the line current.

To operate at partial output capacity, switch 14 is engaged with low contacts 20 which connect motor 16 to the second source of electrical power 12 which has a lower frequency than the first source of power, with or without a reduced voltage. Preferably, the second source of power is single phase and has a frequency within the range of about 20–50 hz. More preferably, the second source of power has a frequency within the range of about 32–37 hz.

Preferably, the second source of power 12 is a reduced frequency wave form generator, although other, equally capable devices will be readily apparent to one skilled in the art. The reduced frequency wave form generator can be a Warner 3φ SL 3000 electronic device adapted for producing 1φ simulated sine wave. Other generators include, for example, a conventional electromechanical generator. The generators applied to the present invention will preferably generate a D.C. voltage from line power and then modulate that D.C. voltage to generate a simulated, single phase power at the desired frequency and voltage.

Figure 2:
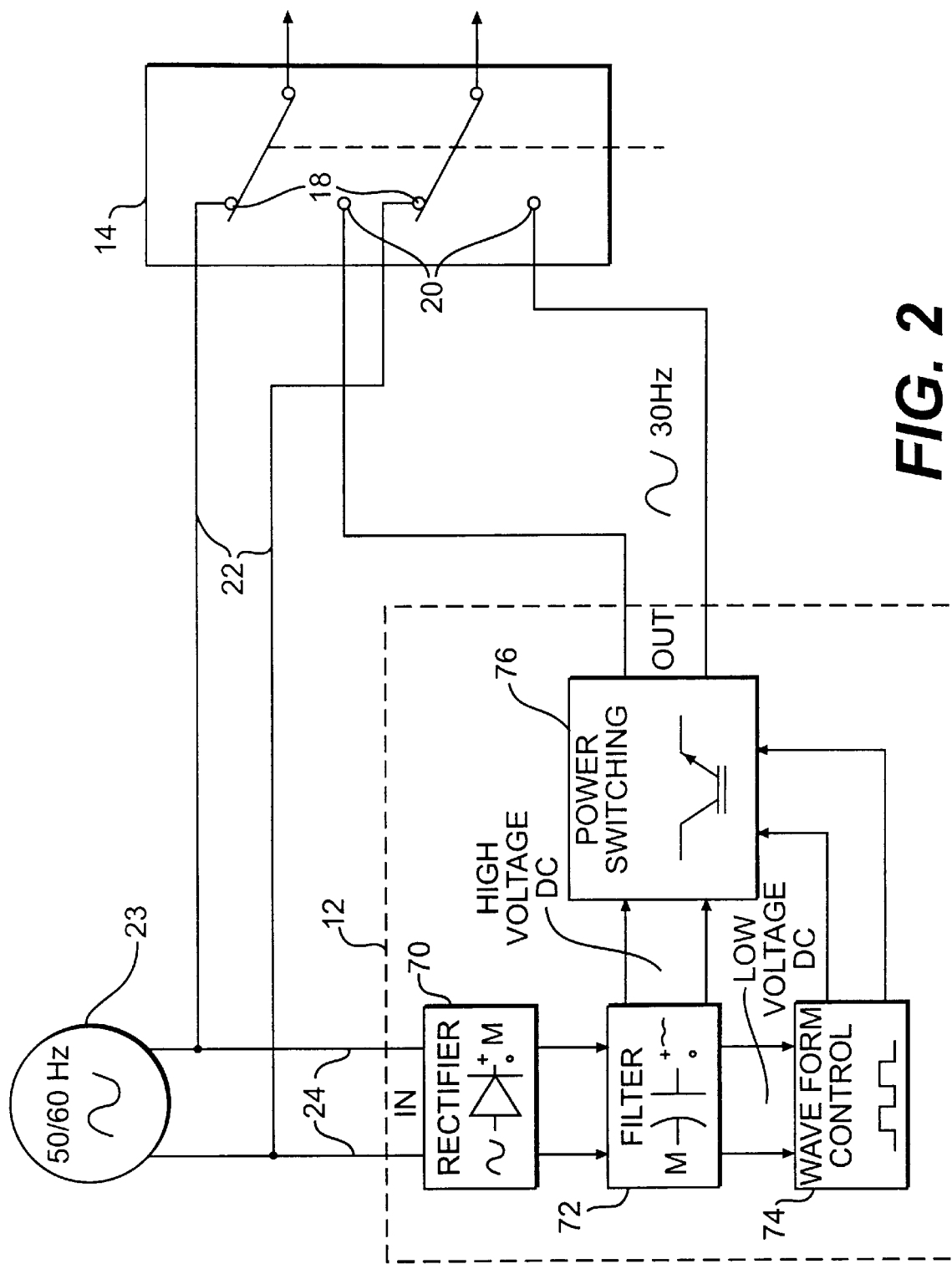
FIG. 2 is an electrical schematic of one example of a single phase inverter according to the present invention.

In a preferred embodiment and as shown in FIG. 2, second source of power 12 is a single phase inverter 12 is interconnected to the line power 23 by power lines 24. It should be noted that there are many devices capable of generating 30 hz from the available 60 hz supply line. The following description exemplifies one such device. Based on this disclosure and the principles of the invention, other alternatives and modifications will be readily apparent to one skilled in the art.

As illustrated in FIG. 2, inverter 12 includes a rectifier 70, a filter 72, a wave form controller 74, and a power switch 76. Rectifier 70 rectifies the power input from the AC source 23 to create a pulsating DC level nearly equal to the peak value of the AC input. This pulsating DC power is fed into filter 72, which can be a relatively large capacitor, that filters the input pulsating DC and produces a high voltage DC component and a low voltage DC component.

The low voltage DC component is input into wave form controller 74. Wave form controller 74 produces a control signal to turn power switch 76 on or off at specific times to produce 30 hz power. This function can be performed by a digital signal processor (DSP), or microprocessor, that has been programmed to provide the required switch control wave form.

One method of creating the control signal is to use pulse width modulation (PWM). This method uses a relatively high frequency "carrier wave form" to produce the control signal inputs to power switch 76. The control signals are "time representative" of the amplitude and frequency of the desired output sine wave. The resulting power switch output is a virtual duplicate of the desired wave form when applied to the motor. Another method of creating the control signal is to use a squarewave generator. This approach uses a lower cost processor to produce a squarewave control signal that duplicates the desired frequency of the output power. It is contemplated that other methods of creating the control signal will be readily apparent to one skilled in the art.

The power switch 76 receives the control signal as input. Based on the control signal, power switch 76 is turned on or off at specific times to create a power output having the desired frequency, preferably approximately 30 hz. When switch 14 engages low contacts 20, this lower frequency output drives the motor.

In this manner, the electrical control system of the present invention for an induction motor achieves optimum efficiency at both full and partial loads at reduced electrical component costs and achieves a two-step motor power output in a simplified form. The present invention thus includes a method of providing a two stage electrical induction motor by providing a first source of electrical power at a maximum operating frequency, providing a second source of electrical power at less than said maximum operating frequency, and providing a switch for selectively connecting one or the other of said source to said motor.

In accordance with the present invention, the control system of the present invention may be applied to a variety of HVAC systems for conditioning a space. In a preferred embodiment, the control system of the present invention is used to modulate the output of a single phase motor associated with a component of a HVAC system. Such motors, such as a motor for indoor blowers, condenser fans, compressors, etc., would operate on line power for full capacity (high speed operation) and would be switched to the power generated by the reduced frequency wave form generator for lower capacity (low speed). The reduced frequency wave form generator, which is preferably a single phase inverter, would be designed to provide the optimum voltage/frequency ratio for the motor load point dictated by the application.

Figure 3:
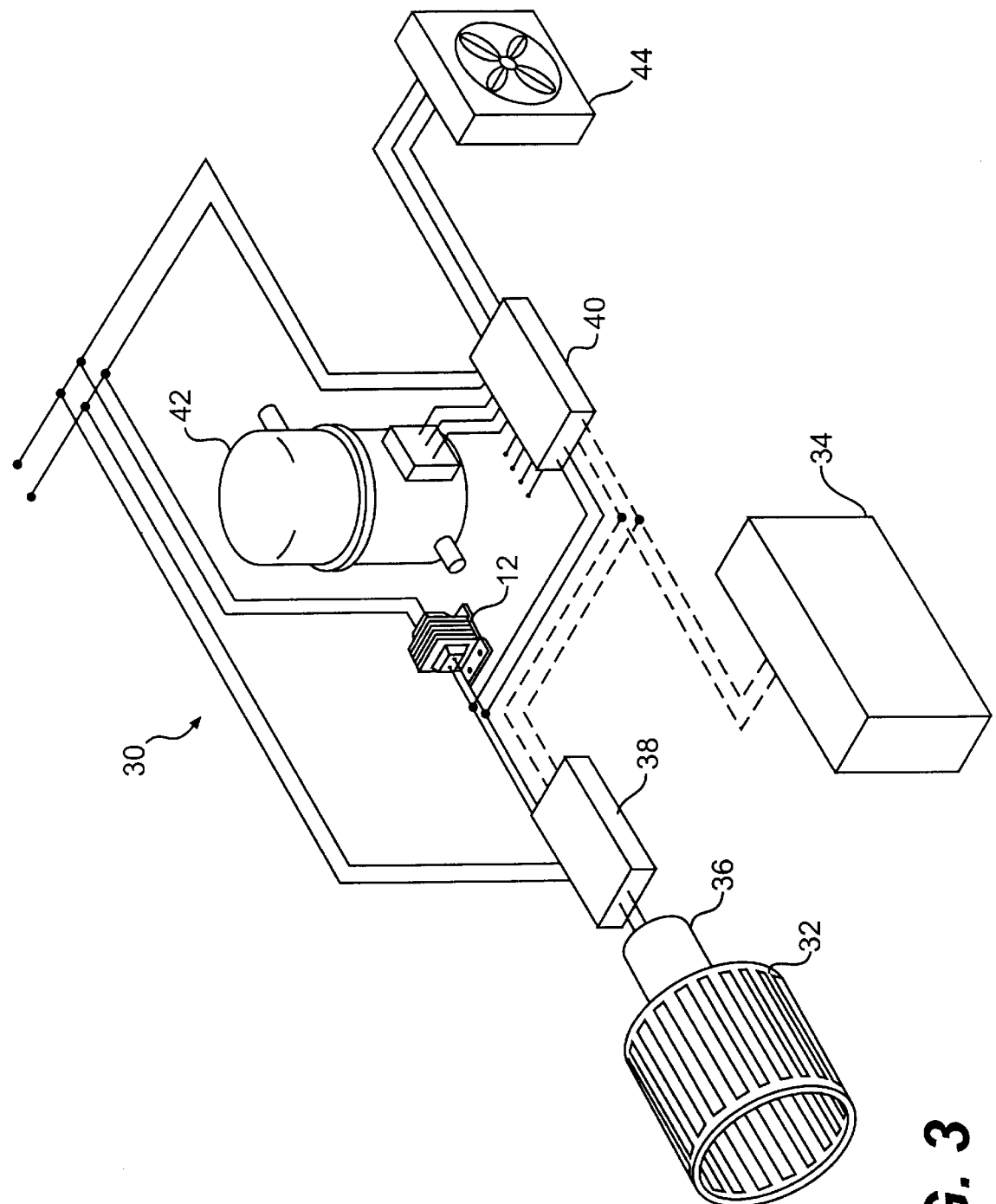
FIG. 3 is a block diagram of an HVAC system including a motor control circuit according to the present invention.

An exemplary embodiment of a HVAC system for conditioning a space is illustrated in FIG. 3. The illustrated embodiment is an air conditioning system, although it is contemplated that the systems and methods disclosed herein are applicable to any HVAC system readily apparent to one skilled in the art, including heat pumps. The HVAC system includes a compressor 42 driven by an electrical motor, an expansion valve, an evaporator, an air mover 32 driven by an electrical motor 36, a condenser, and an outdoor fan 44. Preferably, both the compressor motor and the indoor blower motor are two-staged devices which can operate at a first and second stage, the second stage providing lower output and requiring less power than the first stage.

As known to one skilled in the art, compressors in HVAC systems operate to compress a refrigerant. The compressor may be of any type readily apparent to one skilled in the art, including, but not limited to, a scroll compressor or similar rotary compressor, a screw compressor, or a reciprocating compressor. The output of the compressor is modulated by the HVAC control system, which is connected to the drive motor of the compressor.

If a rotary or screw compressor is used in the HVAC system, the output of the compressor can be staged by the application of the motor speed control of the present invention. In such an application, when the switch of the control system is engaged with the high contacts, the motor of the compressor is driven by the line current, and thus operates at full capacity. When the switch is engaged with the low contacts, the compressor is driven by the second source of power generated by the reduced frequency wave form generator and thus operates at a reduced capacity. In this manner, the power input to the compressor can be decreased when conditions dictate that the compressor need only be run at a partial load. The relative frequency and power of the two sources of power can be chosen to most efficiently match the load conditions of the HVAC system.

As is also known to one skilled in the art, a typical evaporator in a HVAC system includes a series of coils through which the cold refrigerant is passed. Indoor air is moved over the coils by the air mover. The contact of the indoor air on the cold coils reduces the temperature of the indoor air. In a HVAC system incorporating the present invention, the air mover preferably is a blower 32 powered by a single phase, induction motor 36. The blower motor is, for example, such as those available from Lau industries and having a 60 Hz, ½ HP and 1080 rpm rated load. In this preferred embodiment, the blower motor is connected to the control system of the present invention, which in turn is operated by the HVAC control system. As described above, the switch of the control system may be used to connect the blower motor to the line power to run the blower motor at full capacity. Or, the switch may connect the blower motor to the single phase inverter to run the blower motor at partial capacity. By driving the blower motor with the single phase inverter, the power input may be reduced. For example, a blower motor which is designed for about 400 input Watts to produce about 1000 CFM at 0.5 IWG at full load could operate at reduced load with an input of about 100 Watts to produce about 600 CFM at 37 Hz at 0.08 IWG.

Preferably, the control system modulates both the compressor motor and the blower motor in conjunction, so that they operate at matched stages. The output of the compressor and the blower motor are preferably matched to provide the optimum combination of matched loads, at minimize energy costs. By operating the compressor motor and the blower motor at partial capacity when the condition of the space so indicates, the overall efficiency of the HVAC system may be improved. Preferably, the control system also modulate the operation of the outdoor condenser fan to operate at stages matching the compressor and blower motor.

The HVAC system of the present invention can be controlled by a wide variety of thermostats. In a preferred embodiment and as illustrated in FIG. 3, a two stage thermostat 34 is positioned within the space being conditioned to sense the condition of the space. Several such thermostats are available, the thermostat can be, for example, one such as available from the WHITE-ROGERS DIVISION of Emerson Electric Co. and described in detail in the four page INSTRUCTIONS booklet, PART No. 37-3421, which publication is hereby incorporated by reference in its entirety.

The thermostat 34 is connected to control units 38, 40, each of which contain switches 14. Control units 38, 40 govern the position of the respective switch, and, thus, the operating capacity of the HVAC system, based on the condition of the space as sensed by thermostat 34. If the sensed condition indicates the system should operate at full capacity, the switch is moved to engage the high contacts. Similarly, if the sensed condition indicates that the system should operate at partial capacity, the switch is moved to engage the low contacts.

The method of the present invention when applied to the exemplary HVAC system thus includes the steps of sensing the condition of the space to be treated, operating the compressor at a first preselected and fixed speed when the sensed condition indicates that the system should be operated at a maximum load, operating the compressor at a second preselected and fixed speed, lower than the fixed speed, when the sensed condition indicates that the system should be operating in a lesser load, and driving the motor of the air mover by line current when the compressor operates at the first preselected speed and by a second source of fixed power at a frequency lower than the frequency of the line current, when the compressor operates at the second preselected speed.

In the most preferred embodiment, compressor 42 is a two-stage reversible compressor that rotates in a forward direction at the first preselected speed and operates in the reverse direction at the second preselected speed. Such compressors are described generally in U.S. Pat. Nos. 4,479,419; 4,236,874; 4,494,447; and 4,245,966, which are hereby incorporated by reference. With respect to these patents the crankpin journal is complex and comprised of an inner and one or more outer eccentrically configured journals, the inner journal being the outer face of the crankpin shaft, and the outer journal(s) being termed "eccentric cams or rings" in these patents, and being rotatably mounted or stacked on said inner journal. The bearing of the connecting rod is rotatably mounted on the outer face of the outermost journal. Preferred embodiments of these compressors are described more thoroughly in pending application Ser. No. 08/911,481, filed on Aug. 14, 1998, for Adjustable Crankpin Throw Structure Having Improved Throw Stabilizing Means and application Serial No.\_\_\_\_\_ for Two Stage Reciprocating Compressors and Associated HVAC Systems and Methods, filed concurrently with this application.

Figure 4:
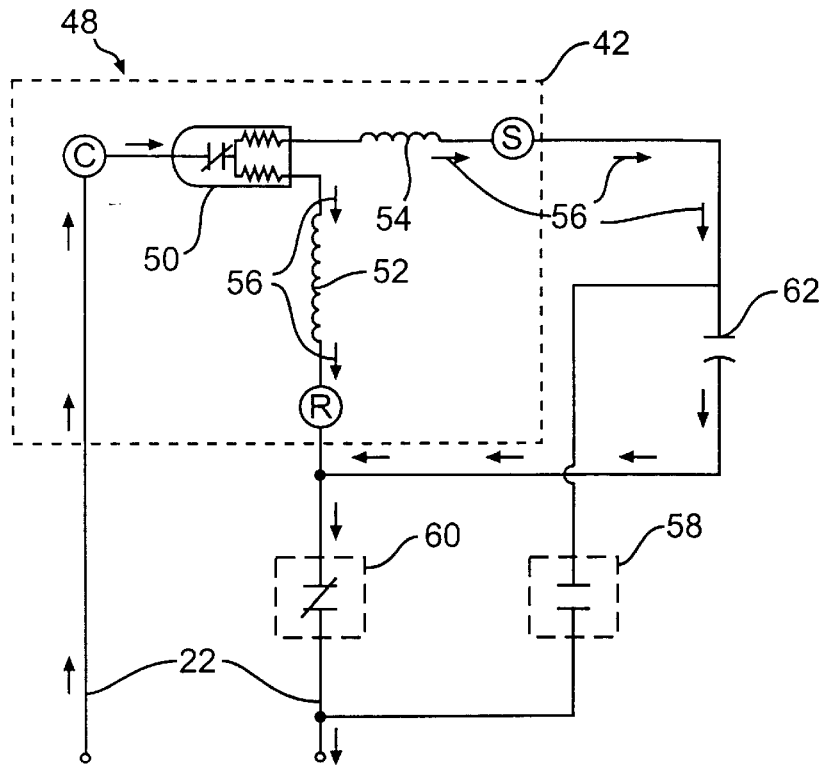
FIG. 4 is an electrical schematic of a compressor motor control for a two stage reversible compressor that can be utilized with an HVAC system according to the present invention, illustrating the compressor motor being run on the start windings.
Figure 5:
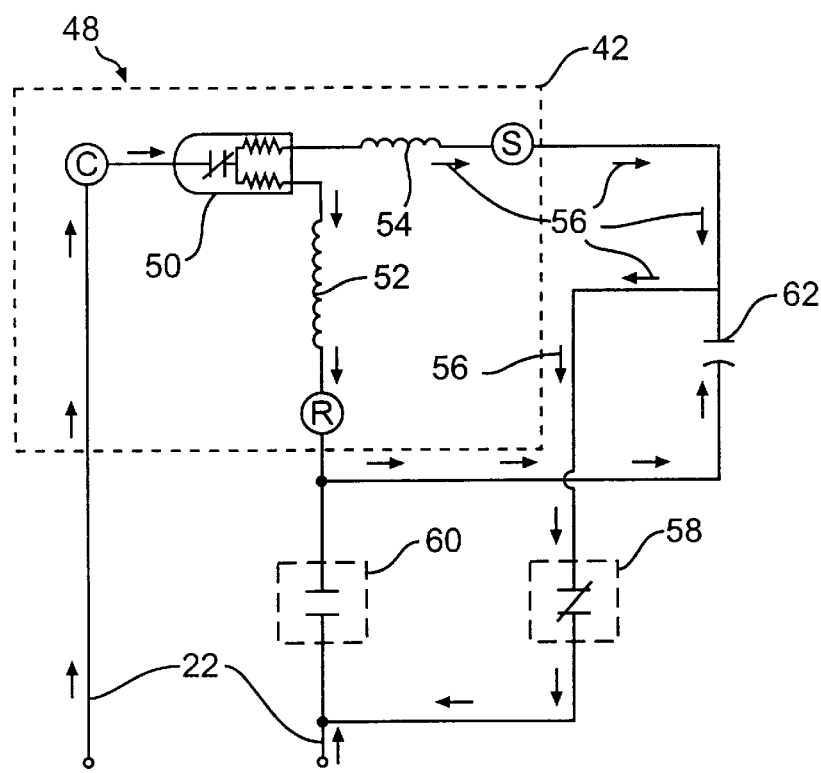
FIG. 5 is an electrical schematic of the compressor motor control of FIG. 4, illustrating the compressor motor being run on the run windings.

In this embodiment and as illustrated in FIGS. 4 and 5, the compressor 48 includes a motor having a start winding 54 and a run winding 52. A motor protector 50 may be interconnected between the windings 52, 54 and the power source to provide protection for the compressor motor. A run capacitor 62, a motor high switch 60, and a motor low switch 58 are also interconnected in the control circuit.

The motor is operated on run windings 52 when it is rotated in one direction and is operated on the start windings 54 when it is rotated in the opposite direction. The windings are chosen such that the motor operates at a first load associated with the maximum load of the compressor when operated in the forward direction and at a second reduced load, again matched to the reduced load of the compressor, when reversed.

Power lines 22 runs through the common terminal (C) which leads into motor protector 50. As shown in FIG. 4, after leaving the motor protector, the current flow will split, as illustrated by arrows 56, going through both the start windings 54 and main, i.e., run windings 52 when the motor high switch 60 is closed. At this stage, the motor will be using run winding 52 as the main winding and places the run capacitor 62 in series with start winding 54, obtaining standard motor rotation with two pistons fully active. The contacts in the preferred embodiment are single pole switches, which are inexpensive and readily available.

As shown in FIG. 5, motor high switch 60 is opened and motor low switch 58 is closed to run the compressor motor in reverse. The motor will then be using start windings 54 as the main windings. This switch position places run capacitor 62 in series with run windings 52. Run capacitor 62 placement in this mode facilitates both motor and mechanical rotation changes and simultaneously reduces motor strength to match the resulting reduced or eliminated piston stroke, thus maximizing motor efficiency for the reduced load.

In reversing motor direction, a delay in switching the motor control switches can be introduced into the system to allow system equalization, or a hard start kit can be used to allow the motor to reverse against load. At least a small delay, lasting from a few seconds up to a minute or two, is required before reversing the direction of the motor.

The windings of the motor are preferably designed to meet the power and speed requirements of the application of the compressor motor, to thereby provide the best match of power and efficiency for the compressor (or other device) when operating at full and low load. Preferably a motor for a given compressor is designed to match the full load capacity of the compressor when it is rotated in the forward direction and the partial load capacity when run in the opposite direction. Preferably, the motor operates at the same speed in both forward and reverse directions.

In a HVAC system incorporating this preferred two-stage reversible compressor with the blower unit, the HVAC control system operates to connect the blower motor to the line power when the compressor is operating at full load and to connect the blower motor to the single phase inverter when the compressor is operating at partial load. It similarly causes the compressor motor to operate on the run windings on the first stage and the start windings in the second stage. A two stage thermostat can be used to control the compressor and blower motors.

The resultant HVAC systems (whether air conditioning systems alone or heat pump systems) provide quiet compressor operation as well as quieter indoor blower operation during the majority of the time when lower loads are required, at reduced electrical component costs and reduced energy consumption.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for operating a system for conditioning a space, the system including a compressor with an electrical motor, an expansion valve, a condenser, an air mover with an electrical motor, and an evaporator, said method including the steps of:
   sensing the condition of the space to be treated;
   operating the compressor at a first preselected and fixed speed when the sensed condition indicates that the system should be operated at a maximum load;
   operating the compressor at a second preselected and fixed speed, lower than the first speed, when the sensed condition indicates that the system should be operated at a lesser load; and
   driving the motor of the air mover by line current when the compressor operates at the first preselected speed and by a second source of fixed power at a frequency lower than the frequency of the line current, when the compressor operates at the second preselected speed.

2. The method of claim 1 wherein said second source of power is produced by a reduced frequency wave form generator.

3. The method of claim 2 wherein the motor of the air mover is a single phase induction motor and the line voltage and the second source of voltage are both single phase.

4. The method of claim 3 wherein the line voltage has a frequency within the range of 50 to 60 Hz, and the second source of power has a frequency within the range of 20 to 50 Hz.

5. The method of claim 4 wherein air mover is a blower to move air over the coils of the evaporator.

6. The method of claim 5 wherein the step of sensing the condition of the space is performed by a two stage thermostat.

7. The method of claim 6 wherein the compressor is a two stage reversible compressor that rotates in the forward direction at the first preselected load and operates in the reverse direction at the second preselected load.

8. The method of claim 7 wherein the compressor motor has run and start windings and runs on the run windings when it rotates in the forward direction and runs on the start windings when it rotates in the reverse direction.

9. The method of claim 8 wherein the speed of the blower motor and the capacity of the compressor are reduced proportionally to each other.

10. The method of claim 9 wherein the line current has a frequency of approximately 60 Hz and the second source of fixed power has a frequency of approximately 30 Hz.

11. A system for conditioning a space, said system comprising:
   a compressor having a motor;
   a blower having a motor;
   a sensor for sensing the condition of the space;
   a first source of electrical power in the form of line power;
   an electrical device connected with the line power for developing a second source of electrical power having a second preselected frequency different than the frequency of the line power; and
   a switching device for selectively connecting the blower motor and the compressor motor to either the first source of electrical power or to the frequency wave form generator depending upon the sensed condition of the space.

12. The system of claim 11 wherein the second preselected frequency of the second source of electrical power is less than the frequency of the line power.

13. The system of claim 12 wherein the electrical device is a frequency wave form generator and the frequency wave form generator produces a single phase simulated sine wave.

14. The system of claim 11 wherein the line power comprises single phase power having a frequency in the range of about 50 to 60 Hz and a voltage in the range of about 110 volts to 277 volts, and said electrical device generates a single phase power having a frequency within the range of about 20 to 50 Hz and a voltage in the range of about 40 to 230 volts.

15. The system of claim 11 wherein the sensor is a two stage thermostat.

16. The system of claim 11 wherein said switching device includes a solenoid switch.

17. The system of claim 11 wherein the motor of the air mover is a single phase induction motor and the line voltage and the second source of electrical power are both single phase.

* * * * *